United States Patent
Miedema et al.

(10) Patent No.: US 7,440,831 B2
(45) Date of Patent: Oct. 21, 2008

(54) ASSEMBLY FOR PERFORMING AN AGRICULTURAL OPERATION, IN PARTICULAR CROP PROCESSING

(75) Inventors: Theo Jan Miedema, De Lier (NL); Karel Van Den Berg, Bleskensgraaf (NL); Alexander Van Der Lely, Rotterdam (NL)

(73) Assignee: Lely Enterprises AG, Zug (CH)

( * ) Notice: Subject to any disclaimer, the term of this patent is extended or adjusted under 35 U.S.C. 154(b) by 279 days.

(21) Appl. No.: 10/250,131

(22) Filed: Jun. 5, 2003

(65) Prior Publication Data

US 2003/0229436 A1    Dec. 11, 2003

(30) Foreign Application Priority Data

Jun. 6, 2002    (NL)    .................................... 1020801

(51) Int. Cl.
*A01B 69/00*    (2006.01)
*G01C 21/00*    (2006.01)
*G06F 19/00*    (2006.01)

(52) U.S. Cl. ............................ 701/50; 701/26; 701/202; 56/10.2 R

(58) Field of Classification Search .................... 701/50, 701/23, 24, 25, 26, 202, 207, 208, 210, 211, 701/213; 56/1, 10.2, 10.2 R; 172/4.5, 72, 172/4; 700/184, 171
See application file for complete search history.

(56) References Cited

U.S. PATENT DOCUMENTS

| 4,769,700 | A | | 9/1988 | Pryor |
| 5,606,850 | A | | 3/1997 | Nakamura |
| 5,712,782 | A | | 1/1998 | Weigelt et al. |
| 5,749,783 | A | * | 5/1998 | Pollklas ....................... 460/119 |
| 5,842,920 | A | * | 12/1998 | Siepker ....................... 460/119 |
| 5,915,313 | A | * | 6/1999 | Bender et al. ............... 111/178 |
| 6,009,354 | A | * | 12/1999 | Flamme et al. ............. 700/184 |
| 6,097,425 | A | * | 8/2000 | Behnke et al. ................ 348/89 |
| 6,128,574 | A | | 10/2000 | Dickhans |
| 6,216,071 | B1 | * | 4/2001 | Motz ........................... 701/50 |
| 6,247,538 | B1 | * | 6/2001 | Takeda et al. ................... 172/2 |
| 6,490,504 | B2 | * | 12/2002 | Son ............................. 700/245 |
| 6,708,631 | B1 | * | 3/2004 | McQuinn et al. ............ 111/174 |
| 2002/0049522 | A1 | * | 4/2002 | Ruffner ........................ 701/23 |
| 2004/0099467 | A1 | * | 5/2004 | Doake et al. ................ 180/400 |

FOREIGN PATENT DOCUMENTS

FR    2.216.755 A    3/1974

* cited by examiner

*Primary Examiner*—Tan Q Nguyen
(74) *Attorney, Agent, or Firm*—David P. Owen; Jacobus C. Rassen; Howrey LLP

(57) ABSTRACT

An assembly for performing an agricultural operation, in particular crop processing. The assembly is provided with an autonomous agricultural machine that is movable over a parcel for performing the agricultural operation, the agricultural machine includes a machine container detachably disposed on the agricultural machine for containing an amount of the product required for performing the agricultural operation. A container for containing a stock of a product required for performing the agricultural operation is also provided and a control-unit automatically moves the agricultural machine to the container where a conveying device automatically exchanges the container with the machine container. Due to the fact that the machine container can be exchanged automatically and quickly with an exchange container, the assembly is relatively efficient in use.

15 Claims, 1 Drawing Sheet

ASSEMBLY FOR PERFORMING AN AGRICULTURAL OPERATION, IN PARTICULAR CROP PROCESSING

CROSS REFERENCE TO RELATED APPLICATIONS

This application claims priority from Dutch patent application no. 1020801 filed 6 Jun. 2002, the contents of which are hereby incorporated by reference in their entirety.

BACKGROUND OF INVENTION

1. Field of Invention

The invention relates to the field of agriculture and to an assembly for performing an agricultural operation, in particular crop processing, using autonomous agricultural machines.

2. Description of the Related Art

Autonomous crop processing machines are known which require no human operator to perform their functions.

Such an assembly is known from U.S. Pat. No. 5,606,850 the contents of which are hereby incorporated by reference in their entirety. In certain such assemblies, when the machine has to be serviced, the machine must be moved to a service area and the relevant action is taken. Such a procedure can be time-consuming.

SUMMARY OF INVENTION

According to the present invention there is provided an alternative assembly, in which a required product can be conveyed quickly to the autonomous machine.

For this purpose, according to the invention an assembly for performing an agricultural operation, in particular crop processing, of the above-described type comprises an autonomous agricultural machine that is movable over a parcel for performing the agricultural operation, the agricultural machine comprising a machine container detachably disposed on the agricultural machine for containing an amount of the product required for performing the agricultural operation; a container for containing a stock of a product, required for performing the agricultural operation; a control-unit for automatically moving the agricultural machine to the container; and a conveying device for automatically exchanging the container with the machine container. Due to the fact that the machine container can be exchanged automatically and quickly with an exchange container, the assembly according to the invention is relatively efficient in use.

In an embodiment of an assembly according to the invention the conveying device is a mechanically operated conveying device. Although a conveying device that is electro-magnetically operated (for example by means of infrared-signals) may be applied as well, such a way of operating is more sensitive to failures than a mechanically operated conveying device.

If the assembly is provided with a measuring device for measuring the amount of product in the exchange container or the machine container, it is possible for example to move, depending on the measured amount, the autonomous agricultural machine to the exchange container.

According to a further aspect of the invention, there is also provided a method for performing an agricultural operation, using an autonomous agricultural machine that is movable over a parcel for performing the agricultural operation, the method comprising: providing the agricultural machine with a machine container containing an amount of a product required for performing the agricultural operation; providing an exchange container containing a reserve stock of the product required for performing the agricultural operation; automatically moving the agricultural machine to the exchange container; and automatically exchanging the exchange container with the machine container. In a particular embodiment, the agricultural operation includes the spreading of fertilizer.

BRIEF DESCRIPTION OF DRAWINGS

An embodiment of the invention will now be explained in further detail by way of example only with reference to the accompanying figure, in which.

DETAILED DESCRIPTION

Figure 1:
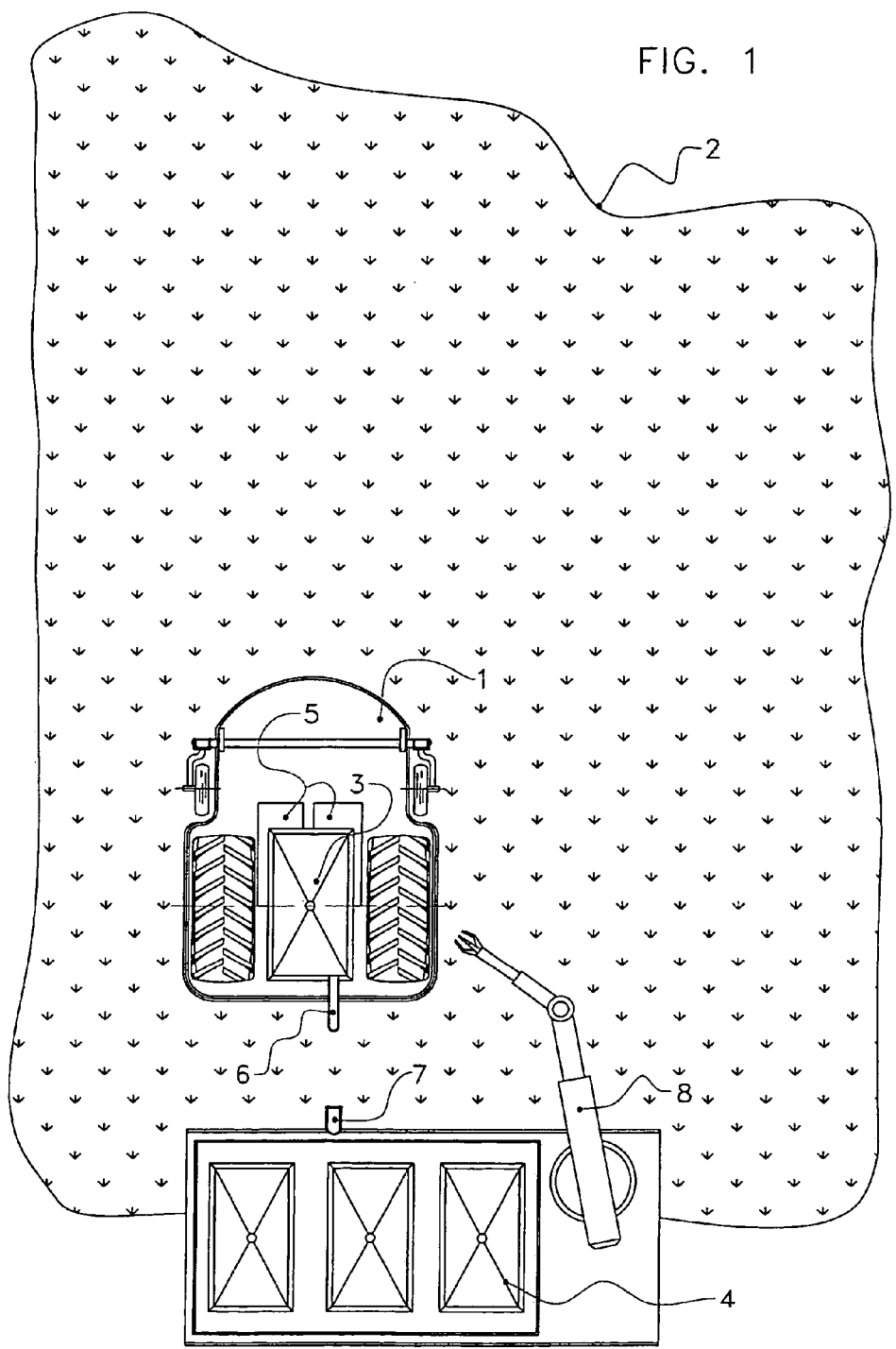
FIG. 1 shows schematically in plan view an autonomous agricultural machine in an agricultural parcel in an embodiment of an assembly according to the invention.

FIG. 1 shows schematically in plan view an autonomous agricultural machine 1 in an agricultural parcel 2 in an embodiment of the invention. It is pointed out here that an autonomous machine, i.e. a machine that does not require a driver for being moved, is known per se and will not be set out here in further detail for the sake of simplicity of the description. Such an autonomous machine may for instance be of the type described in U.S. Pat. No. 4,769,700 the contents of which are hereby incorporated by reference in their entirety.

Various aspects of an autonomous machine are also disclosed in co-pending U. S. patent applications Ser. No. 10/250,099 entitled "An Agricultural Machine for Performing an Agricultural Operation"; Ser. No. 10/250,101 entitled "An Agricultural Machine for Performing Crop Processing"; Ser. No. 10/250,121 entitled "An Autonomous Agricultural Machine for Performing an Agricultural Operations in Particular Crop Processing"; Ser. No. 10/250,105 entitled "A Device for Crop Processing"; Ser. No. 10/250,126 entitled "An Assembly for Performing Crop Harvesting"; Ser. No. 10/250,128 entitled "A System for and a Method of Performing a First and a Second Agricultural Operation on an Agricultural Parcel"; Ser. No. 10/250,127 entitled "An assembly and an autonomous agricultural machine for performing an agricultural operation, in particular crop processing"; and Ser. No. 10/250,104 entitled "An Agricultural Machine for Performing an Agricultural Operation, in Particular Crop Processing", all of which claim priority in the Netherlands on 6 Jun. 2002, the contents of all of which are hereby incorporated by reference in their entirety.

The autonomous agricultural machine 1 is suitable for performing an agricultural operation on the agricultural parcel 2. In the embodiment shown the autonomous agricultural machine 1 is an autonomous manure application machine that manures the agricultural parcel 2 by means of a manuring-unit known per se, for example a fertilizer spreader.

The agricultural machine 1 comprises a machine container 3 for containing a working stock of manure or fertilizer. The autonomous agricultural machine 1 further comprises a route-information system (not-shown) known per se and provided with a memory for containing position data with respect to the agricultural parcel 2. In particular the position of an exchange container 4 containing an amount of the product required for the agricultural operation, in the present case manure or fertilizer, is stored in the memory. This said data may be stored for example in the form of a ground plan. The route-information system further comprises a position-determining device (not-shown) known per se for determining the position of the autonomous agricultural machine 1 in the agricultural parcel 2 by means of for example a GPS-system. Other well known positioning systems may also be used including DGPS, Galileo, or position determination by means of beacons and the like. Thus it is possible for the control-unit of the autonomous agricultural machine 1 to move the agricultural machine 1 to the exchange container 4 with the aid of data from the route-information system, taking the working stock that is still present, as measured for example by a weighing device 5 or another measuring device, into account.

In the embodiment shown the agricultural machine 1 comprises a mechanical protrusion 6 that pushes against a pressure mechanism 7 of a container-exchanging-unit when the agricultural machine has been moved by the control-unit to the container-exchanging-unit. Subsequently, by a mechanical operation, performed for example by a gripping arm 8, the machine container 3 can be taken from the agricultural machine 1, and the exchange container 4 can be disposed on the agricultural machine 1. Various alternative conveying devices may be considered for the exchange of the machine container with the exchange container. Such conveying devices may include robot arms, hydraulic rams, conveyer belts, pneumatic or air cushion devices, tipping devices and any other apparatus suitable for performing such an exchange.

If the stock of the exchange containers is monitored by a measuring device, such as a weighing device, said the measuring device can transmit, for example by telephone, a corresponding signal to the owner of the parcel or other parties concerned.

There is achieved an efficient use of time because of the exchangeability of the containers.

Many modifications in addition to those described above may be made to the structures and techniques described herein without departing from the spirit and scope of the invention. In particular, the devices and methods disclosed herein may also be used in conjunction with further features of the above-referenced co-pending applications. Accordingly, although specific embodiments have been described, these are examples only and are not limiting upon the scope of the invention.

The invention claimed is:

1. An assembly for performing an agricultural operation, comprising:
   an autonomous agricultural machine that is movable over a parcel for performing the agricultural operation, the agricultural machine comprising a machine container detachably disposed on the agricultural machine for containing an amount of a product required for performing the agricultural operation;
   an exchange container being substantially identical to the machine container and containing a further stock of the product required for performing the agricultural operation;
   a control-unit for automatically moving the agricultural machine to the exchange container; and
   a conveying device for automatically exchanging the exchange container with the machine container.

2. The assembly as claimed in claim 1, wherein the conveying device is a mechanically operated conveying device.

3. The assembly as claimed in claim 2 wherein the assembly further comprises a measuring device for measuring an amount of product in the exchange container.

4. The assembly as claimed in claim 3 wherein the assembly further comprises a measuring device for measuring an amount of product in the machine container.

5. The assembly as claimed in claim 2 wherein the assembly further comprises a measuring device for measuring an amount of product in the machine container.

6. The assembly as claimed in claim 1 wherein the assembly further comprises a measuring device for measuring an amount of product in the exchange container.

7. The assembly as claimed in claim 6 wherein the assembly further comprises a measuring device for measuring an amount of product in the machine container.

8. The assembly as claimed in claim 1 wherein the assembly further comprises a measuring device for measuring an amount of product in the machine container.

9. The assembly as claimed in claim 1 wherein the autonomous agricultural machine is a fertilizer spreader and the machine container contains an amount of fertilizer.

10. The assembly as claimed in claim 1 wherein the autonomous agricultural machine further comprising a route-information system having a memory containing position data for the autonomous agricultural machine with respect to the agricultural parcel.

11. The assembly as claimed in claim 8 further comprising a route-information system having a memory containing position data for the autonomous agricultural machine with respect to the agricultural parcel.

12. A method for performing an agricultural operation, using an autonomous agricultural machine that is movable over a parcel for performing the agricultural operation, the method comprising:
    providing the agricultural machine with a machine container containing an amount of a product required for performing the agricultural operation;
    providing an exchange container being substantially identical to the machine container and containing a reserve stock of the product required for performing the agricultural operation;
    automatically moving the agricultural machine to the exchange container; and
    automatically exchanging the exchange container with the machine container.

13. The method as claimed in claim 12 further comprising measuring an amount of product in the machine container and automatically moving the agricultural machine to the exchange container when the amount of product in the machine container is less than a given amount.

14. The method as claimed in claim 13 further comprising automatically determining a route to the exchange container and automatically moving the agricultural machine to the exchange container taking into account the amount of product remaining in the machine container.

15. The method as claimed in claim 12 wherein the autonomous agricultural machine is a fertilizer spreader and the agricultural operation comprises spreading an amount of fertilizer.

* * * * *